United States Patent
Hankins et al.

(10) Patent No.: US 6,628,952 B1
(45) Date of Patent: Sep. 30, 2003

(54) METHOD OF INCREASING CAPACITY IN A FIXED WIRELESS ACCESS NETWORK IN WHICH SUBSCRIBERS COMMUNICATE WITH BASE STATIONS VIA DIRECTIONAL ANTENNAS

(75) Inventors: Timothy R Hankins, Ross on Wye (GB); Mark K Thomas, Newton Abbott (GB); Rachel Swindell, Exeter (GB); Peter Chrystie, Brixham (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/545,546

(22) Filed: Apr. 7, 2000

(51) Int. Cl.[7] .................................................. H04Q 7/20
(52) U.S. Cl. ........................ 455/446; 455/522; 455/453
(58) Field of Search .......................... 455/522, 69, 444, 455/446, 442, 453

(56) References Cited

U.S. PATENT DOCUMENTS

| | | | | |
|---|---|---|---|---|
| 5,898,925 A | * | 4/1999 | Honkasalo et al. | 455/437 |
| 5,940,743 A | * | 8/1999 | Sunay et al. | 455/69 |
| 5,943,610 A | * | 8/1999 | Endo | 455/69 |
| 5,946,612 A | * | 8/1999 | Johansson | 455/405 |
| 6,167,272 A | * | 12/2000 | Hellstern | 455/446 |
| 6,243,591 B1 | * | 6/2001 | Takemura | 455/522 |
| 6,374,085 B1 | * | 4/2002 | Saints et al. | 455/69 |
| 6,466,560 B1 | * | 10/2002 | Lee et al. | 370/335 |
| 6,480,524 B1 | * | 11/2002 | Smith et al. | 375/140 |

* cited by examiner

Primary Examiner—Nay Maung
Assistant Examiner—Tilahun Gesesse
(74) Attorney, Agent, or Firm—Barnes & Thornburg

(57) ABSTRACT

The present invention relates to a method of increasing capacity in a fixed wireless access communications network. The invention also relates to a computer system for implementing the method, a computer program for controlling the computer system and a communications network deployed using the method. The invention, provides a method of increasing capacity in a fixed wireless access network comprising the step of installing an additional base station within an existing cellular deployment plan. The invention aims to minimise the loss of service to existing customers during a capacity upgrade for a fixed wireless access system. The concept of reducing service outage is typically regarded by operators as a higher priority than minimising the time taken or the amount of resource used in order to provide seamless service transition when a subscriber's antenna is re-oriented. The present invention thereby enables a minimum of visits by personnel in connection with this process, for RSS repointing.

6 Claims, 8 Drawing Sheets

N=7

METHOD OF INCREASING CAPACITY IN A FIXED WIRELESS ACCESS NETWORK IN WHICH SUBSCRIBERS COMMUNICATE WITH BASE STATIONS VIA DIRECTIONAL ANTENNAS

BACKGROUND OF THE INVENTION

1. Field of the Invention

The present invention relates to a method of increasing capacity in a fixed wireless access communications network. The invention also relates to a computer system for implementing the method, a computer program for controlling the computer system and a communications network deployed using the method.

2. Description of the Prior Art

Fixed wireless access communications networks use a fixed antenna at each subscriber premises where the antenna is typically directional. Each subscriber antenna communicates with a base station (to which it is directed, in the case that directional antennas are used). Each base station is in turn connected to a physical communications network such as a public switched telephone network via a transmission link. A typical base station supports many subscribers, for example 500 to 2000 subscribers in the IONICA (trade mark) system. The resulting fixed wireless access system is capable of delivering a wide range of access services such as POTS (public operator telephone spice), ISDN and broadband data.

When a fixed wireless access telecommunications system is initially deployed, a base station of a particular capacity is installed to cover a particular populated area. The capabilities of the base station are designed to be commensurate with the anticipated coverage and capacity requirement Subscribers' antennas are mounted on a building, for instance, on a chimney, and upon installation are normally directed towards the nearest (or best signal strength) base station or repeater antenna (any future reference to a base station shall be taken to include a repeater).

In order to meet the capacity demand, within an available frequency band allocation, fixed wireless access systems divide a geographic area to be covered into cells. Within each cell is a base station with which the subscribers' stations communicate; the distance between the cells re-using the same frequency being determined such that co-channel interference is maintained at a tolerable level. When the antenna on the subscriber premises is installed, an optimal direction for the antenna is identified using monitoring equipment The antenna is then mounted so that it is positioned towards the optimal direction.

As already mentioned, fixed wireless access systems divide a geographic area to be covered into cells. For initial planning and design purposes these cells may be represented as hexagons, each cell being served by a base station (in the centre of the hexagon) with which a plurality of subscriber stations within the cell (hexagon) communicate. When detailed cell planning is performed the ideal hexagonal arrangement can start to break down due to site constraints or for radio propagation reasons. The number of subscriber stations which can be supported within each cell is limited by the available number of carrier frequencies and the number of channels per frequency.

Base stations are expensive, and require extensive effort in obtaining planning permission for their erection. In some areas, suitable base station sites may not be available. One aim in the design of a fixed wireless access system design is to have as few base stations as possible, whilst supporting as many subscriber stations as possible. This helps to reduce the cost per subscriber in a fixed wireless access system. Another aim is to increase the traffic carrying capacity of base stations whilst at the same time keeping interference levels within acceptable bounds. This is referred to as trying to optimise or increase the carrier to interference level ratio. By increasing the traffic capacity the number of lost or blocked calls is reduced and call quality can be improved. (A lost call is a call attempt that fails.)

Cells are typically grouped in clusters as shown in FIG. 1. In this example, a cluster of seven cells is shown. Within each cluster 7×6=42 frequencies are each used once. The term "frequency re-use factor" is used to refer to the number of sets of frequencies that the total number of available frequencies is divided into. In this case, the frequencies are divided into 7 sets, one for each cell in a cluster.

FIG. 2 shows how a larger geographical area can be covered by re-using frequencies. In FIG. 2 each frequency is used twice, once in each cluster. The frequency re-use factor N is 7. Co-channel interference could occur between cells using the same frequencies and needs to be guarded against through cell planning.

When the capacity of a cell or cluster is exhausted one possibility is to sectorize each cell. This involves using directional antennas on the base station rather than omnidirectional antennas. The 380° range around the base station is divided up into a number of sectors and bearers are allocated to each sector. In this way more bearers can be added whilst keeping interference down by only using certain frequencies in certain directions or sectors. The frequency re-use factor is a product of the base re-use factor and the sector re-use factor.

Known approaches for seeking to increase system capacity include fixed frequency planning (FFP) which involves carefully planning reuse patterns and creating sector designs in order to reduce the likelihood of interference. For example, FIG. 3 shows an example of a fixed frequency plan with a frequency reuse factor N of 4 and which is known as the "mirror method". Each sector with the same reference numeral is constrained to use a specific set of frequencies that are different from the frequencies used by sectors with different reference numerals. There are four different reference numerals 31, 32, 33, 34, for each of four different frequency sets. The letters H and V are used to denote horizontal and vertically polarised frequency channels. However, fixed frequency planning is problematic because it is often difficult to map a frequency plan onto an actual communications network. This mapping process is complex, time consuming and adds to costs.

Further, when a communications network is deployed according to a fixed frequency plan, the base station locations and pattern of frequencies used for the communications links needs to adhere to the fixed frequency plan closely, in order for the benefits of the fixed frequency plan to be achieved.

The deployment of base stations in a fixed wireless access network is conducted such that anticipated use within a cell can be accommodated. Nevertheless, in some markets subscriber demand has far exceeded predictions. Further, the increasing use of the intemet has changed subscriber call characteristics considerably since subscribers will be connected to intemet service providers for extended periods of time—even if there is little flow of data. Difficulties arise in the maximisation of capacity whilst at the same time maintaining specified link performance levels for all subscribers. Whilst the frequency plans aim to reduce interference, specified link performance levels are not necessarily maintained for all individual subscribers. As subscribers are added to the fixed frequency planned network, there are knock-on effects on the link performance provided to other subscribers. Accordingly there is a requirement to increase the capacity of fixed wireless access networks.

The installation of excess base station capacity at the start of a network rollout has a serious problem in that it requires an expensive up-front investment in extra network infrastructure by the operator—and this infrastructure will take a considerable time to produce any return on the investment There is also a risk that this extra capacity may never be used, since the prediction of service take up by potential subscribers is not an exact science, and market conditions can change unpredictably. This approach amounts to a serious financial risk, that few operators wish to accept.

The capacity of the network can be increased by fitting extra equipment at the base stations. This technique has its limits, however, determined by the fundamental design of the equipment concerned, and also the amount of frequency spectrum available. Once this limit has been reached, the only possible way of providing further capacity (within the existing frequency plan) is to install additional base stations at new cell sites, interspersed between the existing sites.

One problem with adding cell sites to an existing network is that the new base stations will cause interference to existing subscriber equipment located in their vicinity. Since FWA systems do not include roaming (roaming is a feature essential in mobile telephones networks, which allows a subscriber equipment to change the base station it is using automatically, is not provided) because the directional antennas used at the subscriber equipment to improve the radio performance, makes its inclusion impractical within reasonable cost limits, those subscriber links suffering loss of service due to interference require a manual change of host base station, which involves repointing the subscriber equipment towards the new base station. This process requires suitably trained personnel travelling to customer sites, and with potentially hundreds of subscribers involved, this takes a significant time period, during which affected subscribers have lost service due to the interference. Network operators have generally regarded TDMA/FDMA FWA networks using directional subscriber equipment antennas, as not expandable due to this loss of service. Obviously, this may result in a serious curb on the growth of their business.

OBJECT OF THE INVENTION

The present invention seeks to provide a method and apparatus for increasing the capacity of a fixed wireless access network. In particular, the invention seeks to increase the capacity without loss of service to existing subscribers.

STATEMENT OF INVENTION

In accordance with a first aspect of the invention, there is provided a method of increasing capacity in a fixed wireless access network comprising the steps of installing an additional base station within an existing cellular deployment plan; incrementally increasing base station transmitter power levels from an initial level too low to cause interference to subscriber terminals within an area of coverage of the additional base station until normal operating signal power level is achieved; at each incremental power level measuring interference levels caused by the additional base station at each subscriber terminal within its coverage area to ensure that transfer of service at affected subscriber terminals from their existing base station to the additional base station may be undertaken before the interference levels become service affecting; and reducing power levels of the existing base stations according to the new cell boundaries.

In accordance with a further aspect of the invention, there is provided a method of increasing capacity in a fixed wireless access network wherein subscribers have directional antennas, comprising the steps of installing an additional base station within an existing cellular deployment plan; incrementally increasing signal power levels from an initial level too low to cause interference to subscriber receivers within an area of coverage of the additional base station until normal operating signal power level is achieved; determining for each power level, at each subscriber premises within the area of coverage of the additional base station, the signal level from additional base station and comparing the signal relative to a base station with which the subscriber has been communicating; and repointing the subscriber antenna if the signal level is improved.

The invention thus minimises the loss of service to existing customers during a capacity upgrade for a fixed wireless access system. It is possible, using low powers to predict which subscribers may be repointed. The concept of reducing service outage is typically regarded by operators as a higher priority than minimising the time taken or the amount of resource used in order to provide seamless service transition when a subscriber's antenna is reoriented. The present invention thereby enables a minimum of visits by personnel in connection with this process, for RSS repointing.

Preferably, prior to the installation of an additional base station, the existing network is characterised and optimised. A new frequency plan may be deployed for the existing network such that there are spare radio channels available for the additional base station to use. There is a need for spare radio channels for the new cell site to use in some cases these may be found within the existing frequency plan.

The incremental increase in signal level can be predetermined. The signals for which the power levels are monitored can be characteristic signals such as control channel signals. The process of increasing signal power levels can also include an adjustment of antenna down-tilt. The normal operating signal power level can be determined by a balance in traffic load across new and old base stations.

In accordance with the present invention there is provided a method of increasing capacity in a fixed wireless access network wherein subscribers communicate with base stations via directional antennas, comprising the steps of:

i) installing an additional base station;

ii) transmitting signals from the additional base station such that interference is not suffered by existing subscriber stations;

iii) at subscriber stations within an area of coverage of the additional base station measuring received signal levels from the additional base station and comparing with the signals received from previously installed base stations;

iv) selecting a level of output power for the additional base station power level may be increased whereby to cause interference to those subscribers which are most susceptible to interference;

v) repositioning the antennas of subscribers most susceptible to interference towards the additional bas station;

vi) increasing the output power of the additional base station and repeating step iii–v until the additional base station is operating at a target power level.

Preferably, prior to the installation of an additional base station, the existing network is characterised and optimised. A new frequency plan may be deployed for the existing network such that there are spare radio channels available for the additional base station to use.

The incremental increase in signal level can be predetermined. The signals for which the power levels are monitored can be characteristic signals such as control channel signals. The process of increasing signal power levels can also include an adjustment of antenna down-tilt The normal operating signal power level can be determined by a balance in traffic load across new and old base stations.

In accordance with a further aspect, the invention thus minimises the loss of service to existing customers during a capacity upgrade for a fixed wireless access system. The concept of reducing service outage is typically regarded by operators as a higher priority than minimising the time taken or the amount of resource used in order to provide seamless service transition when a subscriber's antenna is re-oriented. The present invention thereby enables a minimum of visits by personnel in connection with this process, for RSS repointing.

In accordance with a still further aspect of the invention there is provided a software analysis tool operable to determine, in a fixed wireless access network which is subject to installation of an additional base station, a number of subscribers which should be repainted to said additional base station, said tool having an input operable to receive measurement data from a radio element manager, analysis means operable to determine those subscriber stations which can be repointed, an output to provide a list of subscriber stations which can be repainted, estimator means operable to estimate the effect of the repainting of subscriber stations and to determine which subscriber means should be repointed.

In accordance with a further aspect of the invention, there is provided a computer program stored on a computer readable medium and arranged to control a software analysis tool operable to determine those subscriber stations which can be repointed, an output to provide a list of subscriber stations which can be repainted, estimator means operable to estimate the effect of the repainting of subscriber stations and to determine which subscriber means should be repointed.

In accordance with a still further aspect of the invention, there is provided a fixed wireless access network which has increased in capacity by the installation of an additional base station within an existing cellular deployment plan, wherein, in the commissioning of the additional base station, the signal power levels were incrementally increased from an initial level too low to cause interference with subscriber receivers within an area of coverage of the additional base station until normal operating signal power level is achieved; wherein, for each power level, at each subscriber premises within the area of coverage of the additional base station, the signal level from additional base station was compared relative to a base station with which the subscriber has been communicating; and repointing the subscriber if the signal level is improved.

In accordance with a further aspect of the invention, there is provided a fixed wireless access network which has increased in capacity arising from the installation of an additional base station within an existing cellular plan; wherein, in the commissioning of the additional base station, the signal power levels were incrementally increased from an initial level too low to cause interference with subscriber receivers within an area of coverage of the additional base station until normal operating signal power level is achieved; wherein, for each power level, at each subscriber premises within the area of coverage of the additional base station, the signal level from additional base station was compared relative to a base station with which the subscriber has been communicating; and repointing the subscriber if the signal level is improved

BRIEF DESCRIPTION OF THE DRAWINGS

Embodiments of the invention will now be described with reference to the accompanying drawings, in which.

DETAILED DESCRIPTION

Embodiments of the present invention are described by way of example only. These examples represent the best ways of putting the invention into practice that are presently known to the applicant although they are not the only ways in which this could be achieved.

The process of cell splitting can be broken down into several major stages. Some of the associated activities, such as planning new backhaul links and adding new interfaces at the switch have been omitted in the following description.

In the first instance, new cell-site locations and capacities are identified and acquired with consideration to the predetermined capacity load and distribution across the network. A rollout plan for the new cell sites is determined with intermediate and final cell plans, which include channel allocation, transmit power, antenna down-tilt, and strategy to avoid adjacent channels.

Figure 1:
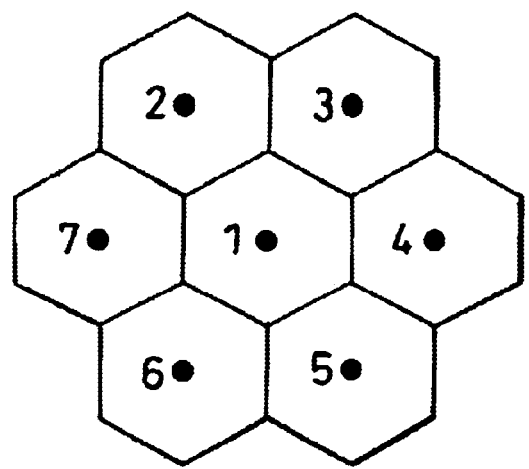
FIG. 1 shows a cluster of seven cells according to the prior art that are represented as hexagons.
Figure 2:
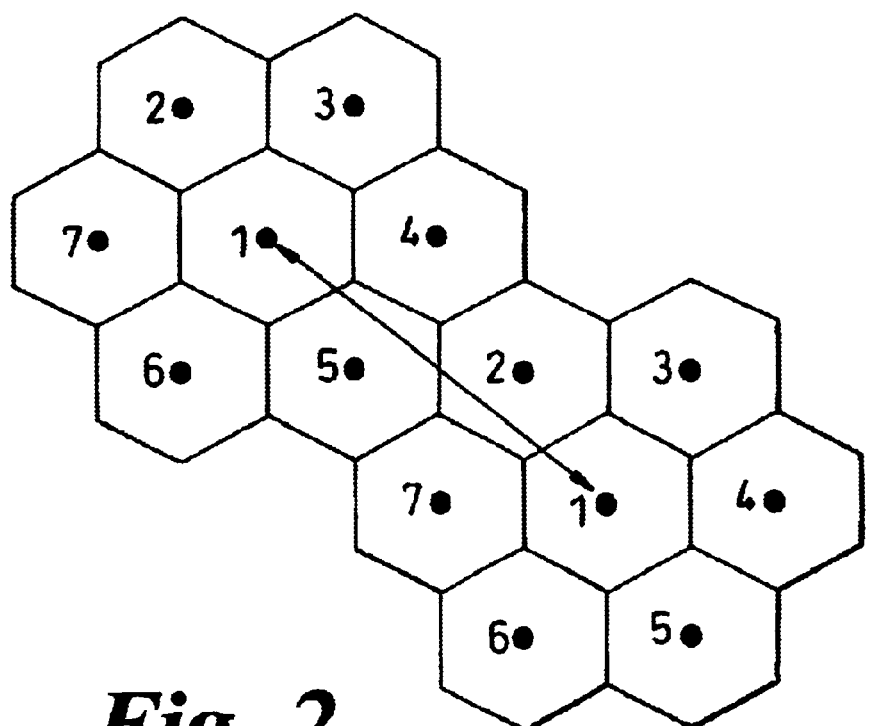
FIG. 2 shows two clusters of seven cells according to the prior art where each frequency is used once in each duster.
Figure 3:
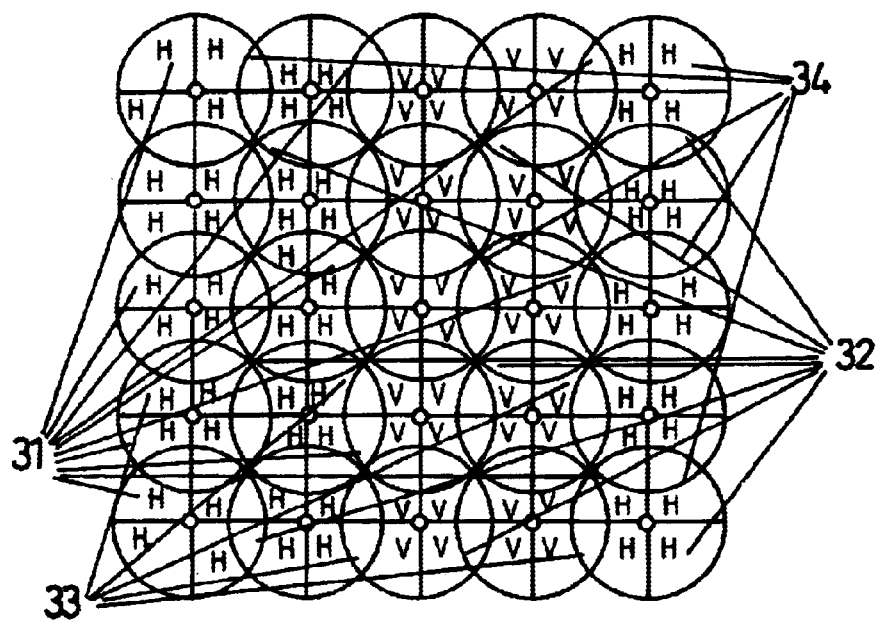
FIG. 3 shows a fixed frequency plan according to the prior art with a frequency reuse factor of 4 according to the so called "mirror method".
Figure 4:
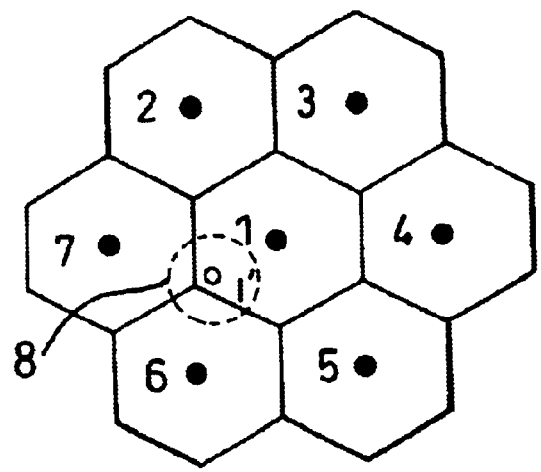
FIG. 4 shows the introduction of an additional base station.

Existing radio base station-residential service system (RBS-RSS) radio links are then characterised, with equipment compatibility checks made, for example: the information held on the radio element managers (REM) and other operator service systems (OSS) about network elements and software releases on all RSSs are checked and corrected as necessary. Measurements on all RSSs are made to get receive signal strength indication (RSSI) and network power histograms which are commonly formatted as comma separated value (CSV) histograms; The location, RBS and sector assignment information for each RSS is obtained FIG. 4 shows how a new base station, 1', would be situated with respect to existing, regularly spaced base stations, 1–7. The intermittent line, 8, indicates a possible area of coverage of the base station. It should be noted that base stations are rarely spaced apart in regular intervals, since issues arise over the suitability of terrain, the availability of suitable land and anticipated subscriber demand.

It may be necessary to upgrade existing cell-sites to a particular frequency plan, but this step will not always be required. There is also a need for spare radio channels for the new cell site to use. In some cases these may be found within the existing frequency plan. Generally, servicing of the RSSs and infrastructure is performed. In the case that there are RSSs detected which are subject to interference from the new cell-plan, then an investigation is made and re-pointing is effected.

The invention detects RSSs which are subject to interference from a new RBS otherwise known as a base station. These RSSs are investigated and repointed as appropriate. Additionally, the invention also provides means to predict which RSSs are likely to be affected by planned transmit power and down-tilt changes on existing RBSs, which RSSs are surveyed and re-pointed. The RBS transmit powers and antenna down-tilts are adjusted and RSSs which have (unexpectedly) been affected by change in transmit power/down-tilt are determined and, surveyed and re-pointed as necessary. Accordingly, the invention provides a method of balancing traffic load across new and old RSSs and identifying RSSs which are candidates for re-pointing, survey and re-point.

Figure 5:
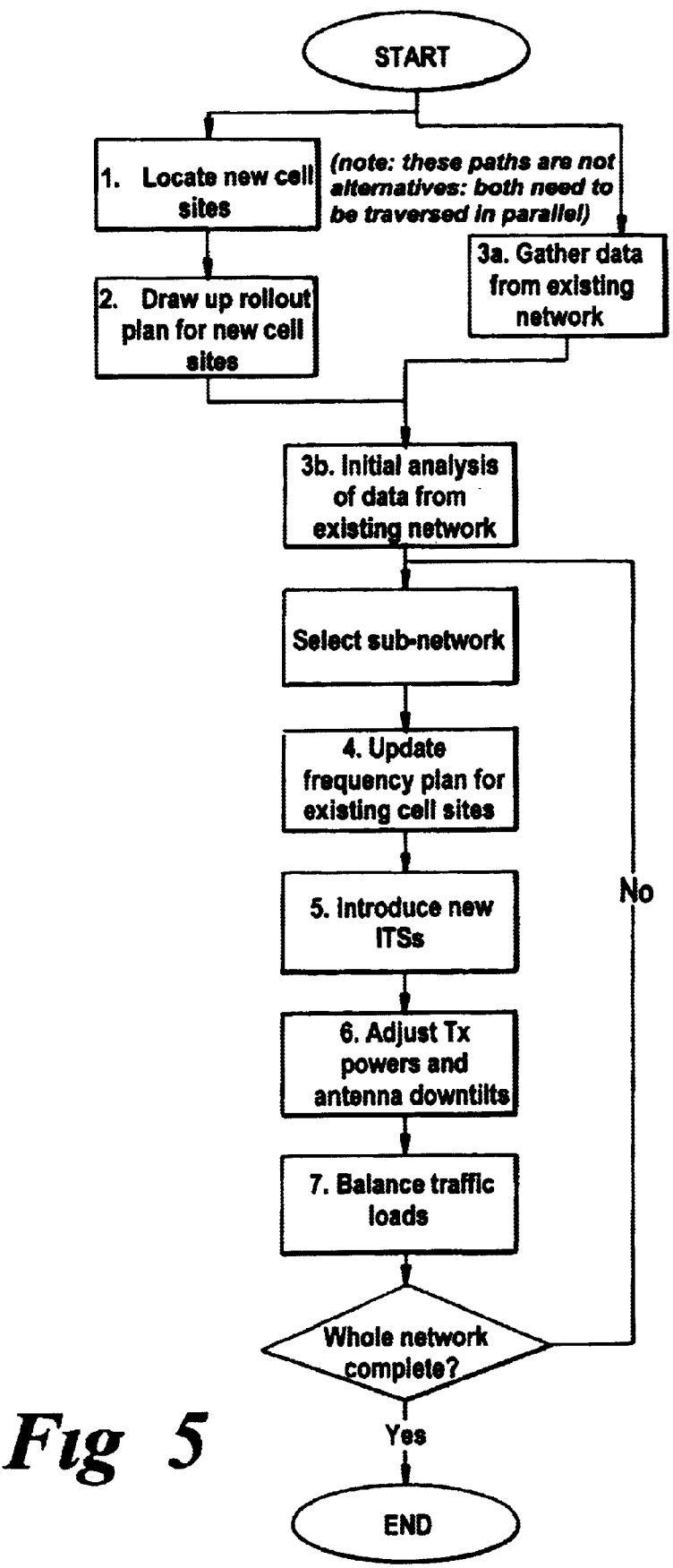
FIG. 5 comprises a high level flow chart detailing deployment of the invention.

Referring now to FIG. 5, there is a first, top level, flowchart indicating how the outline process above may be practically applied to a network where second additional base stations will be introduced.

The design stages, that of locating new sites and the rollout plan (steps 1 and 2) and the data gathering (step 3a) may be carried out in parallel, as they are independent However, they must all be completed before analysis of this data can be undertaken (step 3b).

The cell plans created in step 2 will include a number of intermediate plans for sections of the network, or 'sub-networks', where individual base stations will be introducted. Breaking up the network into smaller pieces is advisable to ensure that individual operations are small enough to be successfully carried out in one night, and so that normal activities (such as RSS installation) may carry on in parts of the network not currently affected by the cell splitting.

Thus there will be multiple passes through steps 4, 5 and 6, and a planning exercise—'Select sub-network'—will be required between steps 3b and 4, to pick the next section of the network to tackled. In some cases step 4 will not be required if the new RBS to be added is at the edge of the existing network.

Step 7, that of balancing traffic loads, is shown taking place as soon as the new cell-site and its neighbours are operating normally it can also be done later if desired: i.e. It is possible to move on to another sub-network and carry out cell splitting, and leave traffic load balancing to a different team, if this is convenient.

RSS installations will have to be suspended on the affected cell sites for much of this process, to provide a stable RSS population to work with. Conveniently, a PC based analysis tool, is employed to facilitate the cell-splitting process: here an overview of their usage is given.

Figure 6:
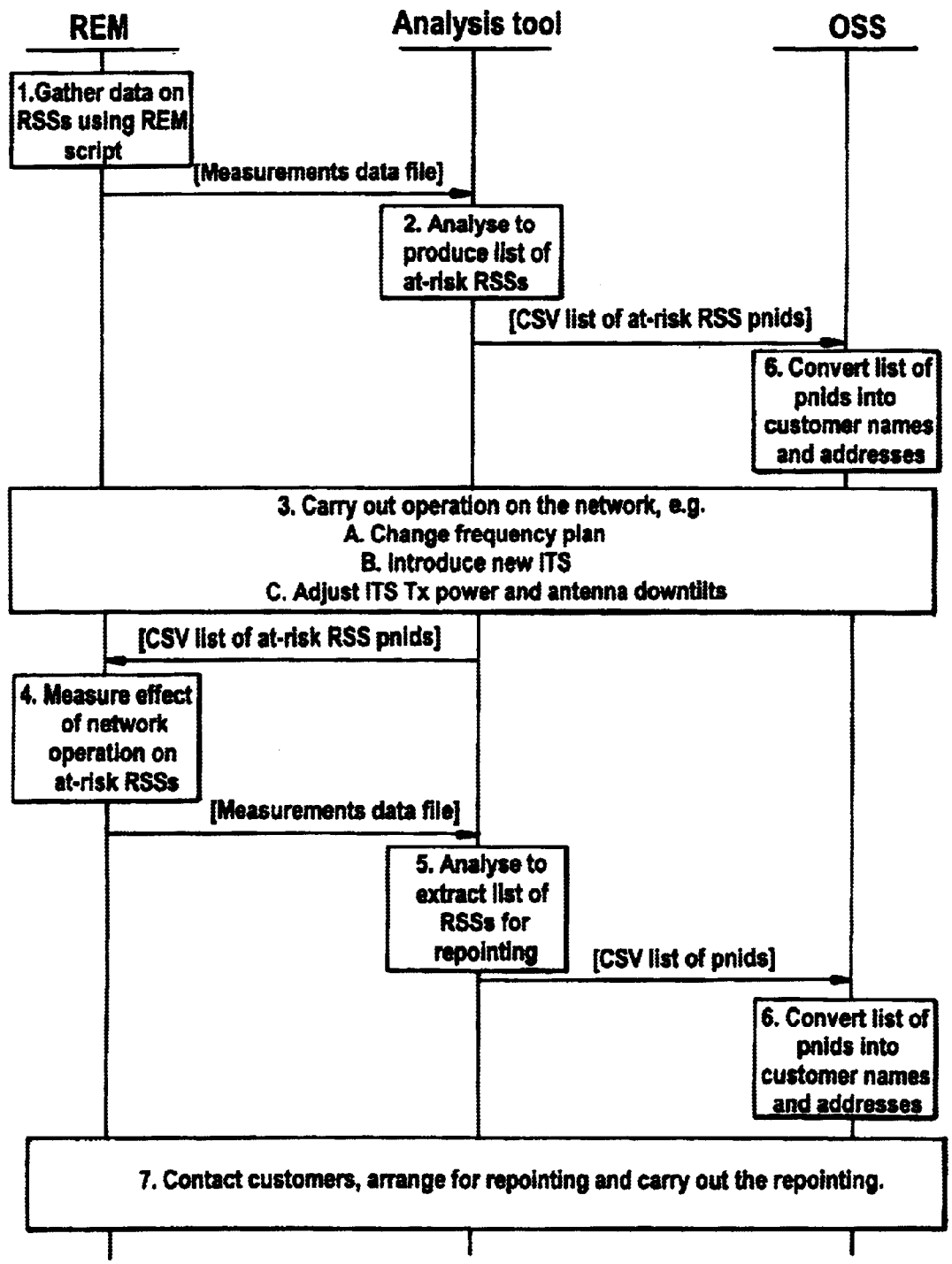
FIG. 6 shows data flow between REM, analysis tool and OSS.

FIG. 6 shows the interchange of files between the REM, RSS maintenance tool (RMT) and OSSs during cell splitting. This sub-process will be repeated a number of times during the overall process shown in FIG. 5 The first step comprises the gathering of data from the RSSs—This will generally only need to be done once on the existing network of RSSs. Having done this general survey, most operations can begin at activity 2, which comprises an analysis of the data.

It will not be possible to continue RSS installations while cell splitting is in progress, since many of the install crews will be involved in the RSS repointing activity, and it is difficult to re-engineer the network reliably if the content of that network is changing! A compromise is possible however RSS installation need not cease across the entire network, Just the sub-network being worked on at any particular time. Thus once a sub-network has been selected (see flowchart above), RSS installation will then need to cease before step 4 is attempted. This may take several days for previously planned installation to be completed.

During this period, it will be necessary to update the information gained in steps 3a and 3b to ensure that any new RSSs added since the original data gathering exercise are taken into account A list of new RSSs (by its identity and permanent NTE identity (pnid) should be obtained so that REM checks can be rerun on these, and their information added to the database. OSSs including the REM hold a lot of information about the network 'as built'. Particularly important for cell splitting is an accurate picture of the RSSs, their location(lat/long) and contact data for the subscribers using them. Corruption of a certain amount this data may have occurred for a variety of reasons. Making corrections to this data win be essential to ensure the success of the cell splitting exercises and this will form part of the initial reparation work (see step 3a below).

These steps comprise activities that are common to the planning of a new network, so are not described in detail here. The major difference is that the existing network must be taken into account—it is carrying traffic throughout the exercise, and disruption must be kept to an absolute minimum. In addition, unavoidable disruption must be predicted, as far as practical, so existing customers can be forewarned. Following these steps results in the provision of a list of new cell site locations cell-site configurations (which allow new RBS hardware to be ordered); and a a set of intermediate and final cell plans, identifying the sub-networks, and giving the following information: frequency plans; and RBS antenna downtilts and transmit power levels.

Referring again to FIG. 5, step 3a can be started while the planning steps 1 and 2 are also underway. It consists of a data gathering exercise on all the existing RSSs in the network, that are likely to be affected by the cell splitting. Efficient data gathering and storage techniques can be essential. Data can be gathered by two means: database interrogation and by the taking of measurements from the RBW-RSS radio link using network terminating equipment (NTE) test calls. Thus 'at-risk' RSSs will be found by considering both their location in relation to existing and new RBSs, and also by considering the result of measurements on the radio links. It will be evident that the exercise cannot be limited to merely gathering data. Checks need to be run to ensure that the data is reasonably accurate and where errors are discovered, these must be rectified.

Figure 7:
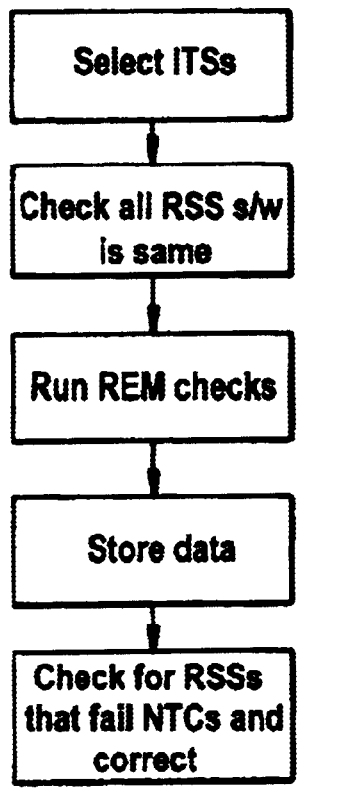
FIG. 7 comprises a flow chart of data gathering process for RSSs in network.

The sequence of activities is shown in FIG. 7, where the REM outputs files which is stored on a PC running Microsoft Access or other suitable program. Before any data is gathered, the software in each RSS must be checked to ensure it is compatible. An initial check should be run on the data to search for any RSSs that have failed one or more network terminating equipment test calls (NTCs). This can happen for a number of reasons: Another call was in progress when the NTC was requested; an 'NTC overload' state has been set; and the RSS-RBS radio link has failed (e.g. because the RSS has its power switched off).

The second reason will normally only occur in the busy hour, and if this is carried out overnight this problem will not arise. Reason i) will occur in a few cases, and can be overcome by repeating the NTC to that RSS at a later time. Reason iii) will occur occasionally, and as many of these RSSs as possible need to be sorted out before the exercise continues further. It is well worth investing some time at this stage to sort out troublesome RSSs of this kind, since failure to do so is liable to cause distractions later in the more intensive, time critical steps.

During each operation on the network (see subsequent steps), a new analysis of the data will generally be required that is pertinent to that particular operation. An initial analysis of data is required however to weed out any RSSs that are already having problems before the operations start. These may be units that have some sort of hardware or software fault, or have been installed badly or have suffered some change to the radio link such as increased loss through foliate that was not present at the time of installation. Identifying these RSSs in trouble is determined if, for example, they have failed one or more NTCs, except for 'call conflict'; they have a mean RSSI level below the minimum install level; or they show high vector error levels and/or FEC failure count.

Figure 8:
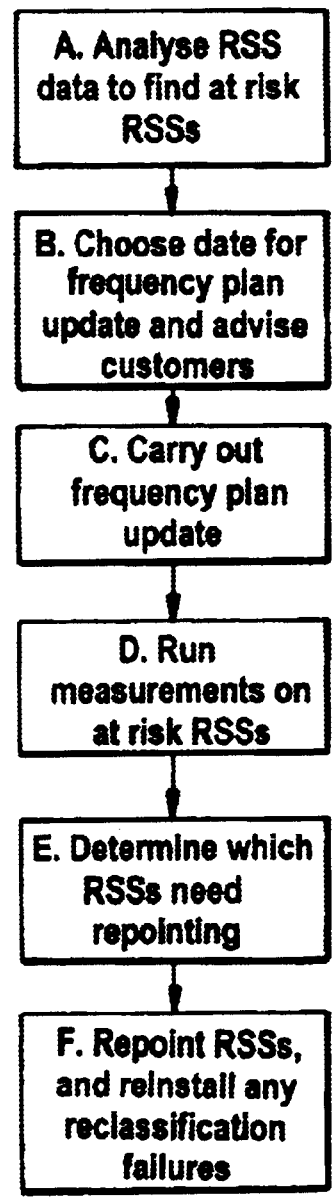
FIG. 8 comprises a flow chart for updating frequency plans.

Those RSSs, which fail NTCs on all carriers tested for reasons other than 'call conflict' are effectively out of service, and the reason for this situation needs to be determined. A check may show that a recent mains fail alarm has been received for this RSS, and it is then reasonable to assume that the subscriber has knowingly powered it down. If this is not the case, and it has been established that a real subscriber exists at the location specified, then a customer visit may be required to deal with an apparent fault and restore service. Those RSSs that have very low mean RSSI or very high mean vector error across all carriers tested, indicate that their radio links are sufficiently fragile that they are unlikely to withstand changes in the network. These also should be repainted if possible. The frequency plan may need to be updated on the selected sub-network prior to introducing any new cell sites. The activities for step 4 of FIG. 5 are shown in the flow chart of FIG. 8.

The data gathered in step 3a will now need to be analysed specifically for use in the current frequency re-planning exercise, with a view to identifying the at risk RSSs. This is done so that examination of the network after the changes have been made to the network (activities D & E) may be carried out reasonably swiftly: it is not possible to spend days gathering data on every RSS when a few percent of customers have lost service completely so a strategy that will rapidly restore service is adopted. In most cases it is hoped to completely avoid the need for a change of frequency plan.

This analysis will essentially be looking for RSSs that already have marginal links, and which may move into the 'unacceptable link quality' category after the changes are made. Changing the frequency plan to accommodate more cell-sites, is liable to result in reduced channel to interference ratio, C/I, for a number of existing customers, as an RSS with interferers at N channels offset suddenly has to cope with interferers at (N−1) channels offset These RSSs will be those that already had marginal links.

The output of activity A will be a list of at risk RSSs by permanent network termination equipment identity (pnid). This will be used later as an input to the REM script in activity D.

Customers need to be warned that changes are to be made to the network, and that not only may service be disrupted during a specific period, but also that their particular RSS may lose service, or suffer a very poor quality of service for much longer. Naturally this will take some days to accomplish (either by phone or post), and any specific customer requirements should be noted.

The actual update of the cell plan involves taking carriers out of service, before changing their operating frequencies. While an effort will be made to allow calls to terminate naturally, inevitably some long calls will be forcibly terminated. It thus makes sense to carry out this task during a very quiet low traffic period, e.g. In the middle of the night.

Any RSSs that fall to accept the frequency changes will be noted. The numbers here should be very low (particularly if NTC failures found in step 3b have been previously dealt with). These RSSs should be entered immediately on the list for a site visit during activity F—they may not need repointing, they are more likely to need re-installation and maybe RTU replacement as well.

Following the change to the network, another set of measurements now need to be run to identify which RSSs are suffering a degraded QoS. To make this reasonably fast, this has to be confined to the list of at risk RSSs identified in activity A.

A vector error histogram together with the max, min and mean RSSI measurements will be determined. If the number of at risk RSSs is too high to allow measurements to be made on each carrier that each RSS uses, the measurement should be confined to a subset of the carriers—choice of carriers being determined by the exact changes made to the frequency plan.

Analysing the results will result in a list of RSSs for repointing. Criteria for RSSs needing repointing are: those that fail one or more NTCs for reasons other than call conflict; and those with high vector error and high FEC failure count.

Since it is highly desirable to only carry out one repointing for any one customer's RSS, a judgement made about the necessity of repointing at this stage—particularly if the customer is likely to require a further repointing once the new cell sites become available. Thus the analysis may be run several times setting different failure limits, to separate out the RSSs that have totally lost service, from those that are merely suffering a degraded QoS.

A pre-requisite for this stop is that the new RBS(s) are ready for use. That is to say that they have been fully commissioned and accepted for service, with all the necessary operating permit. Another pre-requisite is a list of the RSSs that are 'at-risk' from interference from the new RBS(s)—this is generated in step 3b. The essential problem that this step tackles is the switching on of the new RBS, allowing repointing of existing RSSs to start, while at the same time avoiding a service outage for existing customers.

Figure 9:
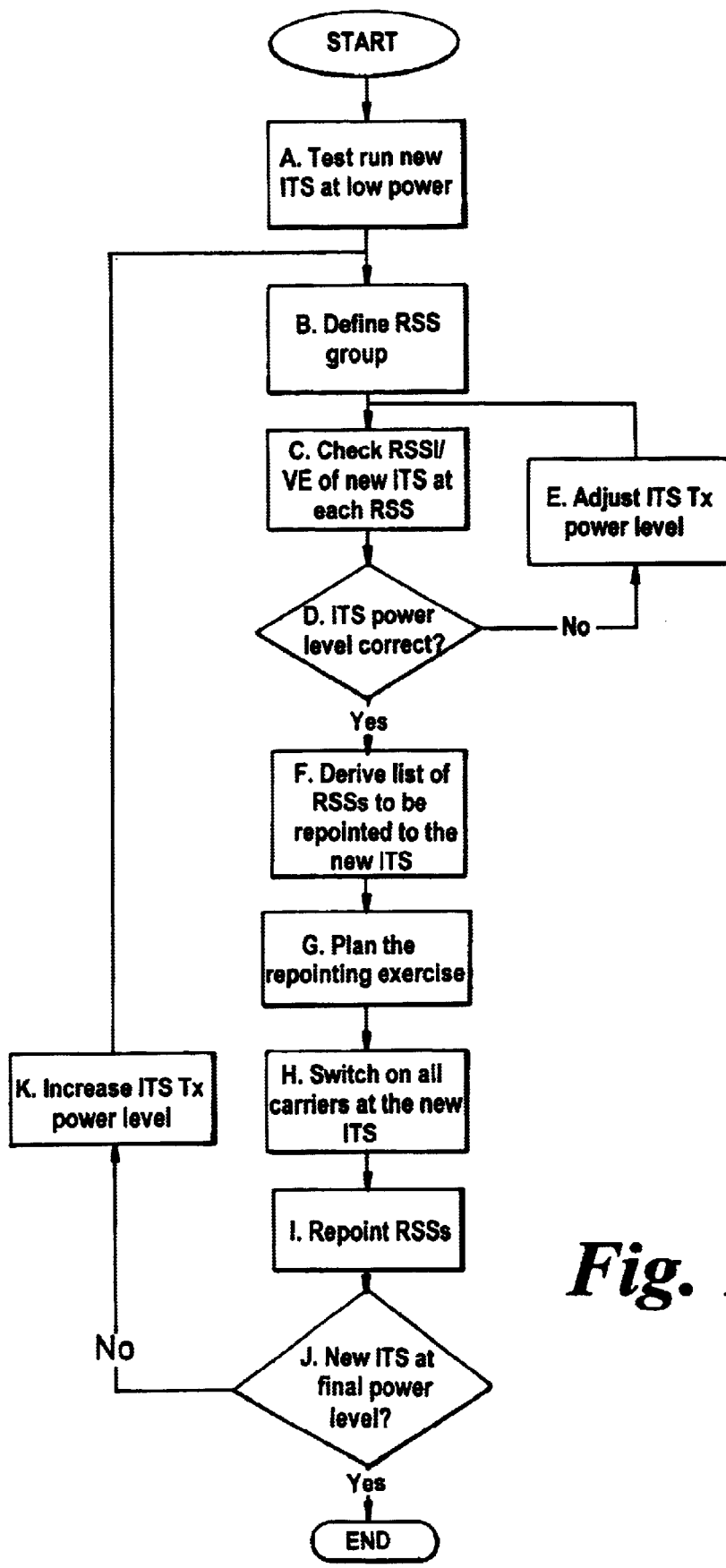
FIG. 9 comprises a flow chart for introducing an additional RBS.

With reference to FIG. 9, which is a flowchart detailing the steps associated with the introduction of a new RBS the approach adopted starts with the new RBS transmit power at a low level. This level is set to that subscribers that are dose to this RBS can successfully be repainted to use it, whilst being low enough to avoid causing interference to these subscribers' RSSs while they are still getting service from their original RBS. The advantages of this scheme are that: there is no loss of service for existing subscribers, and the repointing can be carried out at whatever pace the available resources will allow.

The first pass through the fifth step of the flowchart as far as activity E, is carried out with just one carrier from the new RBS radiating at an initial low power level. This may need adjustment (activities D/E) if it looks as though loss of service will result because it is too high, or is too low to give adequate service to the close-in RSSs. A list of RSSs to be repointed will emerge from this exercise, and once the repointing is complete, the RBS transmit power can be increased to provide service to more RSSs at a slightly greater range from the new RBS.

Figure 10:
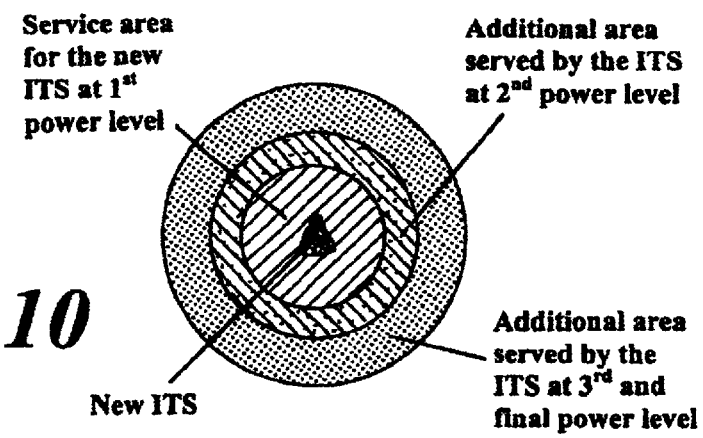
FIG. 10 shows the effect of increasing transmit power from a new RBS.

The new RBS will thus affect an increasingly large surrounding area, in a controlled manner. This is illustrated diagrammatically in FIG. 10, where the transmit power is set at 3 levels (it may be more or less in practice). It must be emphasised that the representation of the affected areas as annular rings is only diagrammatic—in reality the RSSs affected will be scattered, apparently at random, depending on terrain, clutter and all the other factors that make propagation hard to predict. The most important factor will be the direction that each RSS is pointing—an RSS pointing directly towards the new RBS will plainly need to take service from it sooner than one pointing away from it The new RBS is tested at an initial low power level—the signals are conveniently transmitted on a control channel, although normal communications channels may be employed. The choice of this power level is not particularly critical, provided a) it is high enough to give service to some of the nearby RSSs, and b) it is low enough not to cause loss of service to any of the nearby RSSs. An estimate of the required power level may be made. The new RBS will be tested for its effect on the surrounding RSSs. This may be done at night to minimise the disruption to service. The number of carriers to be activated on the new RBS should be kept to an absolute minimum. Depending on the frequency plan, there may be just one carrier frequency that will have the worst effect, because it is operating, for instance, on an adjacent channel to a neighbouring RBS. A complicating factor is the fact that there will normally be many neighbouring RBSs to be taken into consideration—this will be evident by examining the list of at-risk RSSs, and determining to which RBSs they are attached. The need to gauge the effect of the new RBS on several different RSS populations, may mean operating the new RBS on a number of channels, rather than just one. At this point a choice needs to be made, whether to run the new RBS on just one channel at a time (thus necessitating multiple passes through activities A, B and C to arrive at the full list of RSSs affected) or to run the new RBS on all the channels that will cause interference at the same time.

The second option will be faster, but is more liable to cause disruption to service. Again if the list of at-risk RSSs is short, the time taken to take the measurements on Them will also be short, and thus the amount of disruption acceptable—particularly if the exercise is run in the middle of the night.

The group of RSSs to be tested for a signal from the new RBS being tested has to be defined. This group will tend to be those RSSs physically dose to the new RBS, but the geographical area may be defined using a proprietary network planning tool such as Planet (tm), and then the RSS group drawn up using RMAT. The output from RMAT will be a list of itsids and pnids. A determination will need to be made in respect of whether broadcast measurements on a foreign RBS are available or not. If they are available, then each RSS in the group defined in activity B can be checked for adequate/too much signal level from the new RBS. A C/I ratio can be derived by running REM script 1, first on the home, then on the foreign (i.e. new) RBS, and looking for RSSI levels in each case.

Without broadcast measurements on a foreign RBS, vector error measurements will have to suffice. It will be necessary to repeat them with the new RBS carrier both on and off, to differentiate between multipath effects and genuine interference from the new RBS. Running the measurement results through RMAT will draw up a list of RSSs at threat of loss of service, in which case the RBS power may be judged to be too high. Similarly, if not enough RSSs are seeing the RBS signal at all, then the power is too low. Some trial and error may be needed here to make the correct adjustment for power level.

A subset of the initial RSS group will be suitable for repointing—those that have an adequate signal level, after an allowance has been made for the effect of the RSS antenna pattern. Subscribers are contacted and arrangements are made to visit their premises. Repointing must be required to make the most efficient use of the available resources.

Figure 11:
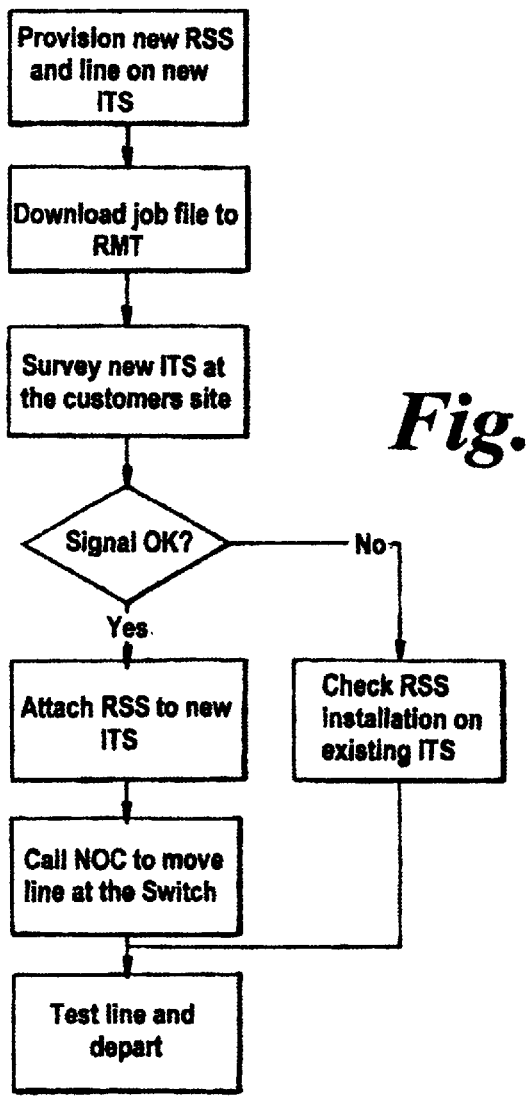
FIG. 11 comprise a flow chart detailing RSS repointing process.

The repainting of antennas (RSSs) is a fairly complex activity in its own right and is explained with reference to thr flowchart in FIG. 11. The process is similar to an RSS installation for a new customer except that the RSS is already installed and working at the site, the switch line is already configured and provisioned and only one RBS needs to be provisioned, since the change of RBS is Known in this case i.e. to the new RBS. No other impact is expected from repointing.

Figure 12:
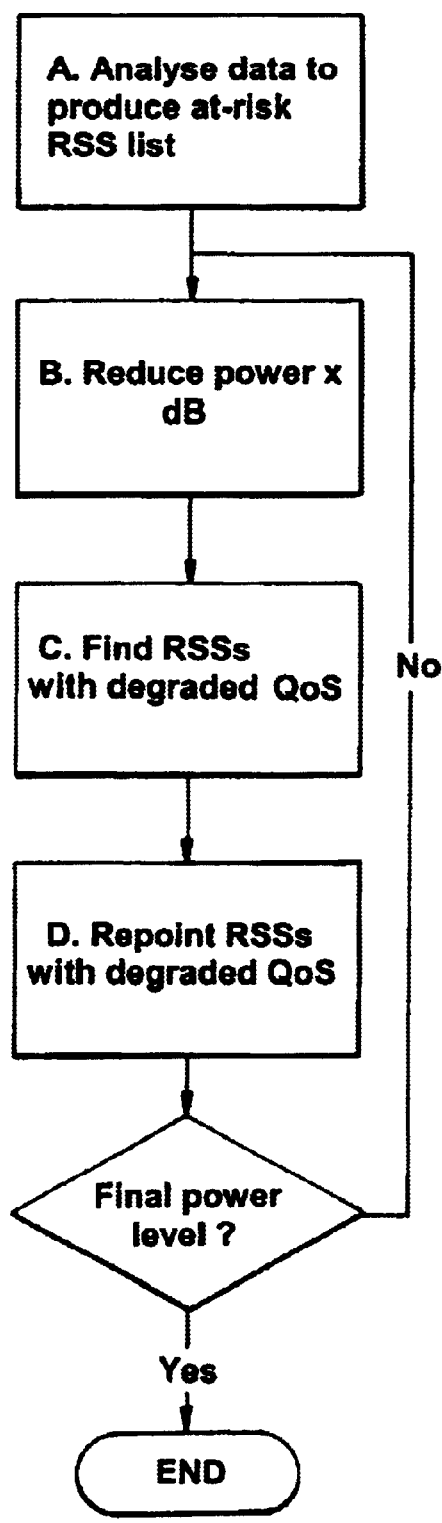
FIG. 12 comprises a flow chart detailing power reduction of a RBS.

The cell plans produced in step 2 will provide the new Tx power settings and antenna downtilts for the existing RBSs that surround a new cell site. Typical power reduction will be in the region of 5–6 dB: this may have to be taken in more than one step, if reducing power by the whole amount will produce more repoints than can be handled within the allowed service degradation time, by the number of install teams available. FIG. 12 shows the activities for power reduction of just one target RBS—typically it will be necessary to carry out this operation on several RBS near to a new cell site, and, furthermore, the process must be repeated for antenna downtilts. In this process, data is analysed to determine those RSSs that are at risk, power is reduced: Those RSSs with degraded QoS are identified and repointed. This process is carried out until a final power level is reached.

Two approaches may be taken here, a power reduction for all carriers simultaneously performed or a more cautious approach is possible where a single carrier per RBS could have its power reduced as an initial test, and measurements taken from that single carrier to Judge its effect before carrying out the full power reduction across all carriers.

The analysis (activity A) of the existing data set (obtained in step 3a) will be looking for. RSSs with RSSI levels too low to maintain an acceptable fade margin after the power reduction: both C/N and C/I ratios need to be considered. Low C/N cases may be found by checking for values of downlink RSSI below (Minimum downlink RSSI level+ planned RBS power reduction). Low C/I is much more difficult to detect the only means of doing this is by looking for instances of marginal vector error. RMAT will be used on the existing data set (from step 3a) to find the at risk RSSs.

Testing should be effected in relation to the at-risk list of RSSs to find out which ones have actually reached an unacceptable C/N or C/I ratio. C/N failures may be found by selecting those RSSs that have a mean RSSI level below the minimum acceptable in the network, and also have the standard deviation of RSSI above a threshold value, thus showing they are subject to sufficient depth of fading that they will fail to meet the availability specification.

There are several tools to be provided for cell splitting which include: a first RPM set of data in a group of RSSs, using in-call measurements (uplink and downlink), broadcast measurements (downlink only) and REM search; a second REM set of data for changing the network frequency plan: and a radio measurement analysis tool (RMAT), which is a database, built with a proprietary program such as Microsoft Access, running on a PC, to store the measurement data from the REM data to analyse it to identify RSSs needing repointing, or similar operations.

The first REM data set is used for collecting data about an RSS and its radio environment The following categories of information will be provided about the RSS and the measurement:

pnid and hardware serial number—these allow the RSS to be tracked during changes to the network. It a RSS is repointed, its pnid will change but the serial number will not, which will aid comparison of test results before and after changes are made;

Location (Lat/Long)—once the location of an RSS is known relative to a new cell site, some simple geometry will quickly identify a large proportion of the at risk RSSs;

Channel number—the channel number that the NTC used or measurement has been set up on;

NTC termination reason (in-call measurements only)—most NTCs will terminate normally, and provide measurement data. Some may conflict with PSTN calls already running. Others may be dropped because of exceptionally poor radio link quality, RSSI and/or VE histograms, plus single measurements of mean RSSI, mean VE and/or FEC failure count—a variety of measurement options are provided to allow assessment of a link quality to be made; measurement type—a variety of measurement options are provided such as no measurements, RSS data only; in-call RSSI histogram plus mean vector error figure, on uplink and downlink;

broadcast RSSI histogram using a demodulated measurement on the downlink: broadcast vector error histogram plus FEC failure count on the downlink, and others;

date and time stamps—these allow measurement data to be correlated with changes in the network.

The second REM data set is used for changing the network frequency plan, prior to the introduction of new cell sites. The new frequency plan will incorporate gaps, so that new cell sites can be slotted in with the minimum disruption to the existing sites. The script changes the operating frequency of carriers on up to 10 RBSs in parallel. All attached RSSs have their classified carrier lists amended accordingly. No attempt is made to co-ordinate the frequency changes between RBSs, so a period of disruption must be expected, while the changes take place. The script allows a time out value to be entered to allow any calls in progress to terminate. If they do not terminate naturally, they will be forcibly dropped once the time expires. The process of changing a carrier frequency is not guaranteed to be 100% successful, and a small number of RSSs may fall to respond to one or more carrier changes. The data set reports a list of RSSs by pnid which have failed to respond. A database is also provided, RMAT, which will store data collected from the network, using the first REM data set. It will also provide facilities for analysis of this data.

The process of analysis may be pictured as a movement through a series of domains; data arrives in the measurement domain. At this point there is only one record per measurement There may be a number of measurements on any one carrier and any one RSS. These may be of different types and taken on different dates. The first transformation typically moves the data to the carrier domain. Each record now represents the measurements on a single carrier from a single RSS. The second transformation moves the data from the carrier domain to the RSS domain, where each record now refers to a single RSS. Thus starting from a collection of measurements over a number of carriers of a group of RSSs, the transforms will identify the subgroup of RSSs of interest. The nature of the transforms used will depend on whether at risk RS, or RSSs providing inadequate service quality (ie needing repointing), are of interest.

What is claimed is:

1. A method of increasing capacity in a fixed wireless access network wherein subscribers communicate with base stations via directional antennas, comprising the steps of:

i) installing an additional base station on a new cell-site;

ii) transmitting signals from the additional base station such that interference is not suffered by existing subscriber stations;

iii) at subscriber stations within an area of coverage of the additional base station measuring received signal levels from the additional base station and comparing with the signals received from previously installed base stations;

iv) selecting a level of output power for the additional base station power level may be increased whereby to cause interference to those subscribers which are most susceptible to interference;

v) repositioning the antennas of subscribers most susceptible to interference towards the additional bas station;

vi) increasing the output power of the additional base station and repeating step iii–v until the additional base station is operating at a target power level.

2. A method according to claim 1, wherein, prior to the installation of an additional base station, the existing network is characterised and optimised.

3. A method according to claim 1 wherein, prior to the installation of an additional base station, the existing network is characterised and optimised and a new frequency plan is deployed such that there are spare radio channels available for the additional base station to use.

4. A method according to claim 1 wherein the incremental increase in signal level is predetermined.

5. A method according to claim 1 wherein the signals transmitted from the additional base station are control channel signals.

6. A method according to claim 1 wherein the process of increasing signal power levels also includes an adjustment of antenna down-tilt.

* * * * *